United States Patent
Ohtani et al.

(10) Patent No.: US 9,409,483 B2
(45) Date of Patent: Aug. 9, 2016

(54) FUEL CELL SYSTEM AND VEHICLE FUEL CELL SYSTEM DISCHARGING METHOD

(71) Applicant: HONDA MOTOR CO., LTD., Tokyo (JP)

(72) Inventors: Takeshi Ohtani, Wako (JP); Kazuyoshi Miyajima, Wako (JP); Akihiro Suzuki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 230 days.

(21) Appl. No.: 14/049,213

(22) Filed: Oct. 9, 2013

(65) Prior Publication Data

US 2014/0106251 A1    Apr. 17, 2014

(30) Foreign Application Priority Data

Oct. 16, 2012  (JP) .................................. 2012-228861

(51) Int. Cl.
| | |
|---|---|
| *H01M 8/04* | (2016.01) |
| *B60L 3/04* | (2006.01) |
| *B60L 1/00* | (2006.01) |
| *B60L 3/00* | (2006.01) |
| *B60L 7/14* | (2006.01) |
| *B60L 11/18* | (2006.01) |

(52) U.S. Cl.
CPC . *B60L 3/04* (2013.01); *B60L 1/003* (2013.01); *B60L 3/0007* (2013.01); *B60L 3/0015* (2013.01); *B60L 3/0053* (2013.01); *B60L 3/0069* (2013.01); *B60L 7/14* (2013.01); *B60L 11/1803* (2013.01); *B60L 11/1861* (2013.01); *B60L 11/1885* (2013.01); *B60L 11/1887* (2013.01); *B60L 11/1892* (2013.01); *H01M 8/04238* (2013.01); *H01M 8/04559* (2013.01); *H01M 8/04955* (2013.01); *B60L 2240/12* (2013.01); *B60L 2240/14* (2013.01); *B60L 2240/26* (2013.01); *B60L 2240/36* (2013.01); *B60L 2240/80* (2013.01); *B60L 2250/10* (2013.01); *B60L 2250/16* (2013.01); *H01M 2250/20* (2013.01); *Y02E 60/50* (2013.01); *Y02T 10/705* (2013.01); *Y02T 10/7044* (2013.01); *Y02T 90/32* (2013.01); *Y02T 90/34* (2013.01)

(58) Field of Classification Search
CPC .................................................. H01M 2250/20
See application file for complete search history.

(56) References Cited

U.S. PATENT DOCUMENTS

| | | | |
|---|---|---|---|
| 7,690,458 B2 | 4/2010 | Ueda | |
| 2007/0023215 A1* | 2/2007 | Ueda | B03B 9/06 180/167 |
| 2012/0062029 A1* | 3/2012 | Fukuyama | B60L 3/0007 307/10.1 |

FOREIGN PATENT DOCUMENTS

JP    2004-349110    12/2004

* cited by examiner

*Primary Examiner* — Stewart Fraser
*Assistant Examiner* — Olatunji Godo
(74) *Attorney, Agent, or Firm* — Mori & Ward, LLP (57) ABSTRACT

A fuel cell system mounted in a vehicle includes a fuel cell, a collision prediction device, a discharge device, and a controller. The fuel cell includes a gas channel to which a reactant gas is to be supplied to generate electricity. The collision prediction device is configured to predict probability of collision of the vehicle. The discharge device is configured to discharge the electricity from the fuel cell. The controller is configured to control the discharge device to discharge the electricity from the fuel cell in a case where the collision prediction device predicts that the probability of collision of the vehicle is higher than a predetermined probability.

13 Claims, 6 Drawing Sheets

FUEL CELL SYSTEM AND VEHICLE FUEL CELL SYSTEM DISCHARGING METHOD

CROSS REFERENCES TO RELATED APPLICATIONS

The present application claims priority under 35 U.S.C. §119 to Japanese Patent Application No. 2012-228861, filed Oct. 16, 2012, entitled "Fuel Cell System." The contents of this application are incorporated herein by reference in their entirety.

BACKGROUND

1. Field

The present disclosure relates to a fuel cell system and a vehicle fuel cell system discharging method.

2. Description of the Related Art

A control unit for an automotive fuel cell system is known that includes a prediction unit that predicts the probability of collision of a vehicle and a stopping unit that stops the automotive fuel cell system when the prediction unit predicts that the probability of collision is high (see, for example, Japanese Unexamined Patent Application Publication No. 2004-349110).

However, with the technology described in Japanese Unexamined Patent Application Publication No. 2004-349110, the fuel cell of the fuel cell system still maintains a high electromotive force when the fuel cell system is stopped. That is, even though the fuel cell system is stopped when it is predicted that the probability of collision is high, if collision of the vehicle occurs as predicted, the vehicle would collide while the electromotive force of the fuel cell is still high.

SUMMARY

According to one aspect of the present disclosure, a fuel cell system mounted in a vehicle includes a fuel cell, a collision prediction device, a discharge device, and a controller. The fuel cell includes a gas channel to which a reactant gas is to be supplied to generate electricity. The collision prediction device is configured to predict probability of collision of the vehicle. The discharge device is configured to discharge the electricity from the fuel cell. The controller is configured to control the discharge device to discharge the electricity from the fuel cell in a case where the collision prediction device predicts that the probability of collision of the vehicle is higher than a predetermined probability.

According to another aspect of the present disclosure, a vehicle fuel cell system discharging method includes predicting probability of collision of a vehicle, and discharging electricity from a fuel cell mounted in the vehicle in a case where probability of collision of the vehicle is higher than a predetermined probability.

DESCRIPTION OF THE EMBODIMENTS

Hereinafter, an embodiment of the present disclosure will be described.

1. Structure of Fuel Cell System

Figure 1:
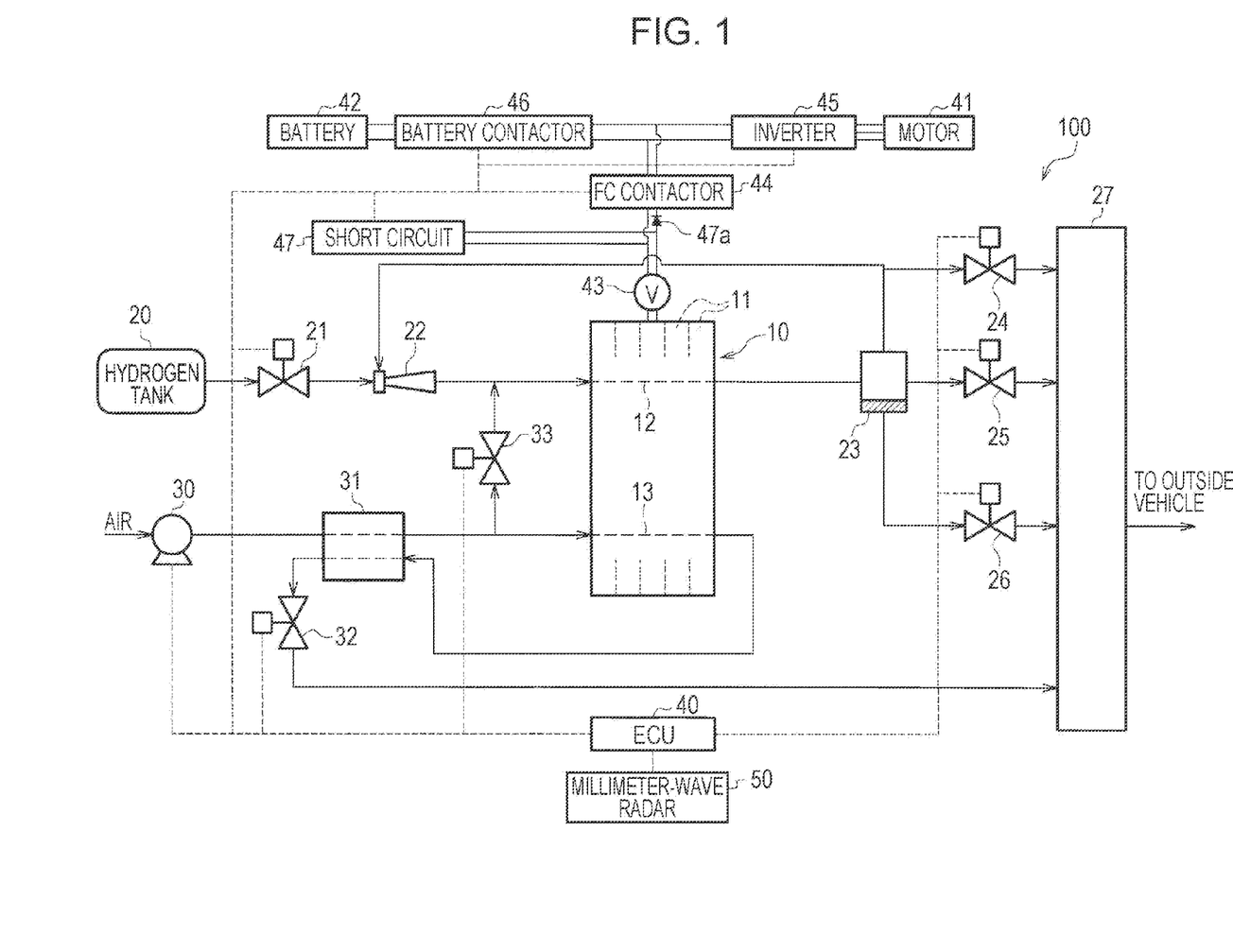
FIG. 1 illustrates the structure of a fuel cell system according to an embodiment.

FIG. 1 illustrates the structure of a fuel cell system 100 according to the present embodiment. The fuel cell system 100 is mounted in a vehicle (an automobile or the like), which is not shown in the drawings. The fuel cell system 100 includes a fuel cell stack 10, an anode system, a cathode system, an electric power consumption system, a short circuit 47, an electronic control unit (ECU) 40 (control unit, collision prediction unit), and a millimeter-wave radar 50 (collision prediction unit). The anode system supplies hydrogen (a fuel gas) to an anode gas channel 12 of the fuel cell stack 10 and discharges hydrogen from the anode gas channel 12. The cathode system supplies air (an oxidant gas) to a cathode gas channel 13 of the fuel cell stack 10 and discharges air from the cathode gas channel 13. The electric power consumption system consumes electric power of the fuel cell stack 10. The short circuit 47 discharges (decreases the electromotive force of) the fuel cell stack 10. The ECU 40 electronically controls these units. The millimeter-wave radar 50 predicts the probability of collision of the vehicle.

Fuel Cell Stack

The fuel cell stack 10 includes a stack of a plurality of (for example, 200 to 400) solid polymer electrolyte unit cells 11, which are connected in series. Each of the unit cells 11 includes a membrane electrode assembly (MEA) and a pair of electroconductive separators that sandwich the MEA therebetween. The structure of each of the unit cells 11 is not illustrated in detail in FIG. 1. The MEA includes an electrolyte membrane (solid polymer electrolyte membrane), which is a monovalent cation exchange membrane; and an anode and a cathode (electrodes) that sandwich the electrolyte membrane therebetween.

The anode and the cathode include electroconductive porous bodies, which are made of carbon paper or the like, and catalysts, which are supported on the porous bodies. The catalysts (platinum, ruthenium, and the like) cause electrode reactions at the anode and cathode. The separators have grooves for supplying hydrogen or air to the entire surface of the MEA, and through-holes for supplying hydrogen or air to and discharging hydrogen or air from all of the unit cells 11. The grooves and through-holes function as the anode gas channel 12 (gas channel (fuel gas channel)) and the cathode gas channel 13 (gas channel (oxidant gas channel)).

When hydrogen is supplied to the anode of each of the unit cells 11 through the anode gas channel 12, an electrode reaction of equation (1) occurs. When air is supplied to the cathode of each of the unit cells 11 through the cathode gas channel 13, an electrode reaction of equation (2) occurs. Thus, a potential difference (open circuit voltage (OCV)) is generated in each of the unit cells 11. When the fuel cell stack 10 is electrically connected to an external load, such as a motor 41 described below, an electric current flows to the external load, and the fuel cell stack 10 generates electricity.

$$2H_2 \rightarrow 4H^+ + 4e^- \quad (1)$$

$$O_2 + 4H^+ + 4e^- \rightarrow 2H_2O \quad (2)$$

As shown in equation (2), water (water vapor) is generated at the cathode. Therefore, a gas that is discharged from the cathode includes water (water vapor, condensed water, or the like). Moreover, because a part of water generated at the cathode cross-leaks to the anode gas channel 12 through the MEA, a gas that is discharged from the anode also includes water.

Anode System

The anode system includes a hydrogen tank 20, a shutoff valve 21, an ejector 22, a gas-liquid separator 23, a purge valve 24, a scavenging-gas outlet valve 25, and a drain valve 26.

The hydrogen tank 20 is connected to the inlet of the anode gas channel 12 of the fuel cell stack 10 through the shutoff valve 21 and the ejector 22. The outlet of the anode gas channel 12 is connected to a diluter 27 (described below) through the gas-liquid separator 23, the purge valve 24, the scavenging-gas outlet valve 25, and the drain valve 26. Moreover, the gas-liquid separator 23 is directly connected to the ejector 22, so that the gas discharged from the anode gas channel 12 is returned to the ejector 22 through the gas-liquid separator 23. The gas returned to the ejector 22 is supplied to the anode gas channel 12 again.

The gas-liquid separator 23 removes water from the gas discharged from the anode gas channel 12. The gas from which water has been removed is supplied through the ejector 22 to the fuel cell stack 10 again. As described above, the gas discharged from the fuel cell stack 10 includes water generated in the chemical reaction. The gas-liquid separator 23 removes the water from the gas discharged from the fuel cell stack 10, and the gas from which water has been removed is returned to the fuel cell stack 10 again.

The gas-liquid separator 23 may separate water from the gas by using, for example, any of the following methods: a method of passing the gas through a channel, whose cross-sectional area gradually increases, so as to gradually decrease the flow speed of the gas and to make the water remain in place under its own weight; a method of causing water vapor in the gas to be condensed by using a cooling tube through which a low-temperature coolant flows; and a method of causing the gas to pass through a meandering or curved path so as to apply a centrifugal force to the water.

Water removed by the gas-liquid separator 23 is discharged through the drain valve 26, which is connected to the gas-liquid separator 23, to the diluter 27. While the gas continues to circulate through the fuel cell stack 10, the gas-liquid separator 23, and the ejector 22, the concentration of nitrogen or the like in the gas may increase. In such a case, the fuel gas is discharged to the diluter 27 by opening the purge valve 24, which is connected to the gas-liquid separator 23.

When the probability of collision of the vehicle becomes high, the fuel cell system 100 connects the short circuit 47 to the fuel cell stack 10 (described below in detail) and scavenges the fuel cell stack 10. When scavenging the fuel cell stack 10, a scavenging gas introduced into the anode gas channel 12 is discharged to the diluter 27 through the scavenging-gas outlet valve 25. A pump 30 of the cathode system introduces the scavenging gas into the anode gas channel 12 through a scavenging-gas intake valve 33, which connects the anode system and the cathode system to each other.

Cathode System

The cathode system includes the pump 30, a humidifier 31, and a back-pressure valve 32.

The pump 30 is connected to the inlet of the cathode gas channel 13 of the fuel cell stack 10 through the humidifier 31. The outlet of the cathode gas channel 13 is connected to the diluter 27 (described below) through the humidifier 31 and the back-pressure valve 32.

The pump 30 draws in air from the outside of the vehicle and supplies the air to the cathode gas channel 13 of the fuel cell stack 10. The fuel cell stack 10 generates electricity by using air supplied to the cathode gas channel 13. When scavenging of the fuel cell stack 10, the scavenging-gas intake valve 33 is opened so that air, which serves as a scavenging gas, is supplied also to the anode gas channel 12.

The pump 30 is inverter-controlled so that its rotation speed and the amount of air supplied to the fuel cell stack 10 can be changed. To be specific, when the rotation speed of the pump 30 increases, the amount of air supplied to the fuel cell stack 10 increases; and when rotation speed of the pump 30 decreases, the amount of air supplied to the fuel cell stack 10 decreases.

The humidifier 31 humidifies air that passes therethrough. The humidifier 31 includes a hollow fiber membrane that is permeable to water. As described above, a gas discharged from the fuel cell stack 10 includes water. The humidifier 31 transfers water from the gas discharged from the cathode gas channel 13, which has a high humidity, to air flowing toward the cathode gas channel 13 through the hollow fiber membrane, thereby humidifying the air flowing toward the cathode gas channel 13. Thus, humid air passes through the cathode gas channel 13, and therefore the solid polymer electrolyte membrane (not shown) of the fuel cell stack 10 becomes humidified.

The back-pressure valve 32 (valve) is disposed downstream of the cathode gas channel 13 in a direction in which air (gas) flows through the cathode gas channel 13. The back-pressure valve 32 can control the flow rate of gas discharged from the cathode gas channel 13. The pressure of gas in the cathode system can be controlled by adjusting the degree to which the back-pressure valve 32 is opened. The back-pressure valve 32 is, for example, a butterfly valve or the like.

In the cathode system, the pump 30 draws in air from the outside, and the air is supplied to the humidifier 31 and becomes humidified. The air, humidified by the humidifier 31, passes through the cathode gas channel 13 of the fuel cell stack 10, and is used to generate electricity. During the process of generating electricity, water is generated as described above. Therefore, the gas discharged from the cathode gas channel 13 is used in the humidifier 31 to humidify air that flows toward the cathode gas channel 13, and then the gas is discharged to the diluter 27 through the back-pressure valve 32.

Diluter

The diluter 27 dilutes hydrogen discharged from the anode system with air and the like discharged from the cathode system. Thus, the hydrogen concentration of a gas discharged from the anode system is reduced, and the gas is discharged to the outside of the vehicle. Water discharged from the anode system is also discharged to the outside of the vehicle through the diluter 27.

Electric Power Consumption System

The electric power consumption system includes the motor 41 and a battery 42. The electric power consumption system is connected to output terminals (not shown) of the fuel cell stack 10 through an FC contactor 44, an inverter 45, and a battery contactor 46.

A diode 47a is disposed between the FC contactor 44 and the fuel cell stack 10. To be specific, the FC contactor 44 is connected to the cathode of the diode 47a and the fuel cell stack 10 is connected to the anode of the diode 47a. The diode 47a allows an electric current to flow only from the fuel cell stack 10 to the electric power consumption system but does not allow an electric current to flow from the electric power consumption system to the fuel cell stack 10. The diode 47a also prevents an electric current from flowing from the electric power consumption system to the short circuit 47 (that is, prevents the short circuit 47 from short-circuiting the electric power consumption system). The function of the diode 47a will be described below in detail.

The FC contactor 44, the inverter 45, and the battery contactor 46 are connected to the ECU 40 through signal wires. Thus, the ECU 40 controls an electric current that flows through the electric power consumption system by controlling the FC contactor 44, the inverter 45, and the battery contactor 46.

The ECU 40 controls the fuel cell system 100. The ECU 40 includes a central processing unit (CPU), a random access memory (RAM), a read only memory (ROM), a hard disk drive (HDD), and the like, which are not illustrated. The function of the ECU 40 is realized when a predetermined program stored in the ROM, the HDD, or the like is loaded into the RAM or the like and the CPU executes the program.

The motor 41 (drive unit) is connected to the fuel cell stack 10 and drives the vehicle by using electric power generated by the fuel cell stack 10. As described below in detail, with the fuel cell system 100, the motor 41 is driven by electric power stored in the battery 42 when hydrogen is not supplied to the fuel cell stack 10. The battery 42 stores, at least, electric power that is generated by the fuel cell stack 10. Therefore, it can be said that, even when the motor 41 is driven by the battery 42, the motor 41 is driven by using electric power generated by the fuel cell stack 10.

The motor 41 is a three-phase alternating current motor, which is driven by using a three-phase alternating current. Because the fuel cell stack 10 generates a direct current electric power, the inverter 45 (described below) converts the direct current electric power into an alternating current electric power, which is supplied to the motor 41. Direct current electric power generated by the fuel cell stack 10 is directly stored in the battery 42.

The FC contactor 44 controls the flow of electricity from the fuel cell stack 10 to the motor 41 and the battery 42. The FC contactor 44 can be switched between a connection mode and a disconnection mode. When the FC contactor 44 is in the connection mode, electric power is supplied from the fuel cell stack 10 to the motor 41 and the battery 42. When the FC contactor 44 is in the disconnection mode, electric power is not supplied from the fuel cell stack 10 to the motor 41 and the battery 42 (that is, the fuel cell stack 10 is electrically disconnected from the motor 41).

When the motor 41 is driving the vehicle, the inverter 45 converts direct current electric power supplied from the fuel cell stack 10 or the battery 42 into alternating current electric power, and supplies the alternating current electric power to the motor 41. When the motor 41 is regenerating electric power, the inverter 45 converts alternating current electric power supplied from the motor 41 to direct current electric power, and supplies the direct current electric power to the battery 42. The inverter 45 includes a semiconductor switching device and the like (not shown), and converts electric power by using the device.

The battery contactor 46 controls the flow of electricity to the battery 42. As with the FC contactor 44, the battery contactor 46 can be switched between a connection mode and a disconnection mode. When the battery contactor 46 is in the connection mode, the battery 42 is connected to the motor 41 and the like, so that electric power can be exchanged therebetween. When the battery contactor 46 is in the disconnection mode, the battery 42 is electrically disconnected from the motor 41 and the like (that is, the battery 42 is electrically disconnected from the fuel cell system 100).

When the motor 41 is driving the vehicle, the FC contactor 44 and the battery contactor 46 are both in connection modes. Therefore, electric power supplied from the fuel cell stack 10 is used to drive the motor 41 and is also supplied to and stored in the battery 42. When supply of hydrogen to the fuel cell stack 10 is stopped and the fuel cell stack 10 stops generating electric power, electric power stored in the battery 42 is used to drive the motor 41. When the motor 41 is regenerating electric power, electric power supplied from the motor 41 is supplied to and stored in the battery 42.

The millimeter-wave radar 50 is connected to the ECU 40. The millimeter-wave radar 50 measures the distance from the vehicle to another vehicle or an obstacle ahead and the velocity of the vehicle relative to the other vehicle or the obstacle ahead. The millimeter-wave radar 50 can detect a vehicle that is edging into traffic or a pedestrian that is running across the road. The millimeter-wave radar 50, which uses the Doppler effect, can measure the distance from the vehicle to another vehicle or an obstacle ahead and the velocity of the vehicle relative to the other vehicle or the obstacle ahead by using a change in the frequency of a millimeter-band radio wave emitted forward and reflected by the other vehicle or the obstacle ahead.

The ECU 40 predicts the probability of collision of the vehicle in accordance with a time to collision (a time before collision will occur) that is calculated on the basis of the distance and the relative velocity measured by the millimeter-wave radar 50. That is, the ECU 40 and the millimeter-wave radar 50 correspond to a collision prediction unit. On the basis of the prediction of the probability of collision of the vehicle, the ECU 40 controls the short circuit 47 (described below) so that the short circuit 47 discharges the fuel cell stack 10. With the fuel cell system 100 according to the present embodiment, scavenging of the fuel cell stack 10 of the vehicle is also performed on the basis of the probability of collision of the vehicle. Prediction of the probability of collision will be described below in the section "2. Control of Fuel Cell System".

Short Circuit

The short circuit 47 (discharge unit) discharges the fuel cell stack 10. The short circuit 47 is directly connected to the fuel cell stack 10. The short circuit 47 is normally disconnected from the fuel cell stack 10 so that the fuel cell stack 10 may not be short-circuited. When the short circuit 47 is connected to the fuel cell stack 10, the fuel cell stack 10 is short-circuited. The fuel cell stack 10 is actively discharged when the fuel cell stack 10 is short-circuited. As a result, the electromotive force $V_{FC}$ of the fuel cell stack 10 decreases. The short circuit 47 is configured so that the electromotive force $V_{FC}$ of the fuel cell stack 10 can be decreased as fast as possible at this time.

The ECU 40 (control unit) switches between disconnection and connection of the short circuit 47. The switching control performed by the ECU 40 will be described below in the section "2. Control of Fuel Cell System".

2. Control of Fuel Cell System

Next, control of the fuel cell system 100 will be described. As described above, the ECU 40, shown in FIG. 1, controls the fuel cell system 100.

With the fuel cell system 100 according to the present embodiment, the short circuit 47 actively discharges the fuel cell stack 10 when the probability of collision of the vehicle becomes high (to be specific, when the time to collision becomes a predetermined value or less). With the present embodiment, the anode gas channel 12 and the cathode gas channel 13 (gas channels) in the fuel cell stack 10 are scavenged by using a scavenging gas. With these operations, when the probability of collision of the vehicle becomes high, the electromotive force $V_{FC}$ of the fuel cell stack 10 can be decreased in a shorter time.

Flow of Overall Control

Figure 2:
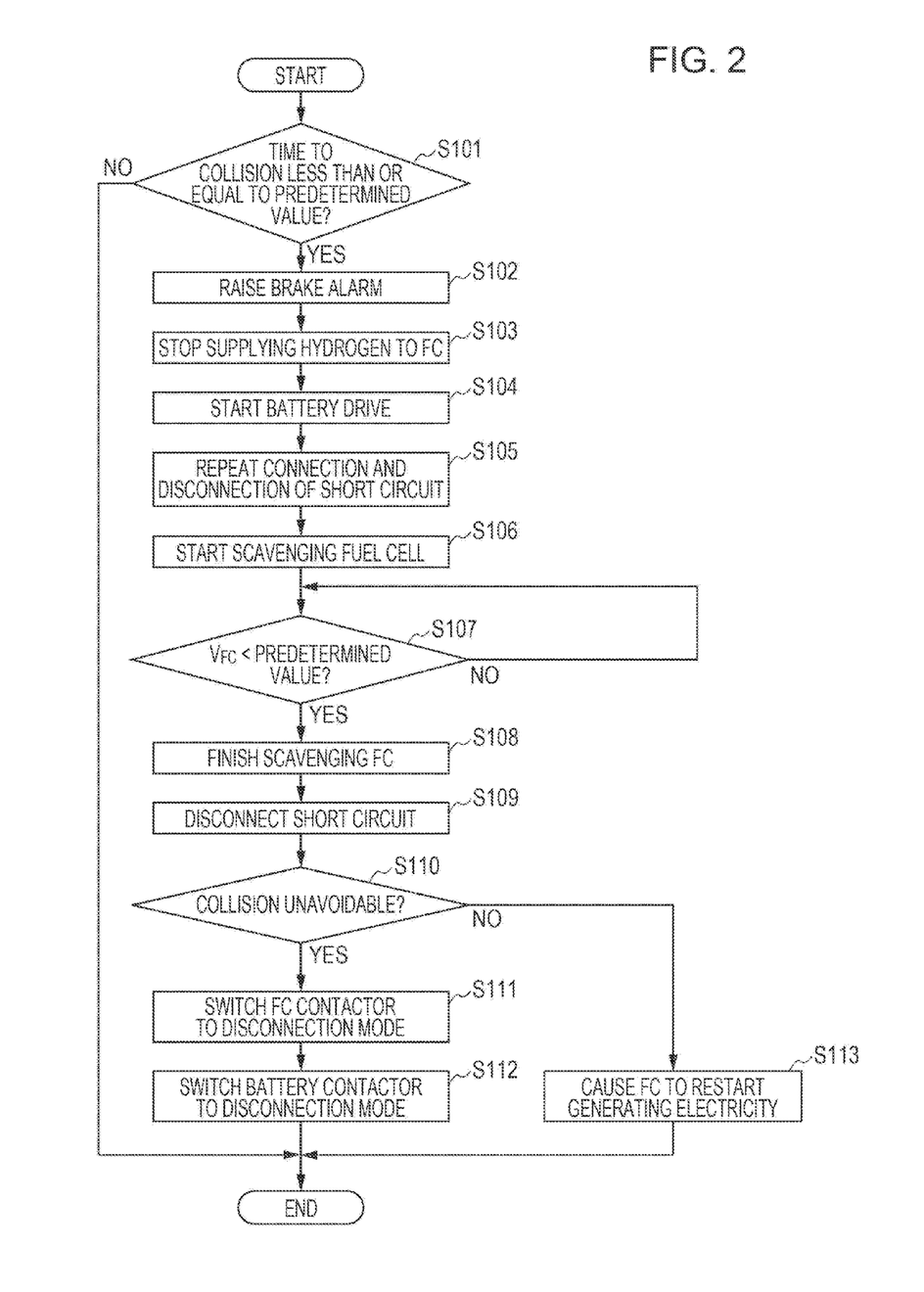
FIG. 2 is a control flow chart of the fuel cell system according to the present embodiment.

When the vehicle is normally driven, the ECU 40 constantly measures the distance from the vehicle to a vehicle or the like ahead and the velocity of the vehicle relative to the vehicle or the like ahead by using the millimeter-wave radar 50. The ECU 40 calculates the time to collision (TTC) using the distance (inter-vehicle distance) to a vehicle (another vehicle) or the like ahead and the velocity of the vehicle relative to the vehicle or the like ahead. If the time to collision is greater than a predetermined value $T_0$ ("No" in step S101), the ECU 40 determines that the probability of collision of the vehicle is low. In this case, steps S102 to S113 illustrated in FIG. 2 are not performed. As described above, when the vehicle is normally driven, the short circuit 47 is disconnected from the fuel cell stack 10 and the fuel cell stack 10 is not short-circuited.

To be specific, the ECU 40 determines that the probability of collision is low when the inter-vehicle distance is large, because the time to collision is long in this case. When, for example, the relative velocity is low, the ECU 40 determines that the probability of collision is low, because the time to collision is long also in this case. Note that the time to collision can be calculated by dividing the inter-vehicle distance by the relative velocity. The "predetermined value $T_0$ of the time to collision" used for determination in step S101 may be changed as necessary in accordance with, for example, the performance of the vehicle, the velocity of the vehicle, the weather, and the like.

The time to collision becomes the predetermined value $T_0$ or less ("Yes" in step S101) when, for example, another car edges into the traffic ahead and the inter-vehicle distance decreases or a vehicle ahead decelerates suddenly and the relative velocity increases. In this case, the ECU 40 determines that the probability of collision is high and causes an alarm unit 9 (not shown) to raise an alarm (step S102). Thus, the ECU 40 warns the driver of collision.

After determining that the probability of collision is high, the ECU 40 closes the shutoff valve 21 to stop supplying hydrogen to the fuel cell stack 10 (FC) (step S103). Thus, the fuel cell stack 10 stops generating electricity. Then, the ECU 40 drives the motor 41 not by using electric power from the fuel cell stack 10 but by using electric power stored in the battery 42. That is, battery drive of the motor 41 is started (step S104).

Then, the ECU 40 connects the short circuit 47 to the fuel cell stack 10 and repeats connection and disconnection of the short circuit 47 (step S105). To be specific, the short circuit 47 is first connected to the fuel cell stack 10. At this time, due to the function of the diode 47a illustrated in FIG. 1, only the fuel cell stack 10 is short-circuited, but the battery 42 and the like are not short-circuited. Subsequently, disconnection and connection of the short circuit 47 are repeated in accordance with the voltage (electromotive force) of the fuel cell stack 10 measured by a voltmeter 43 (see FIG. 1).

When the anode and the cathode of the fuel cell stack 10 are short-circuited, the fuel cell stack 10 is discharged and the electromotive force $V_{FC}$ of the fuel cell stack 10 decreases. The details of the operation of repeating connection and disconnection the short circuit 47 will be described below with reference to FIGS. 3A to 3I, which illustrate how the units of the fuel cell system 100 are controlled.

Furthermore, the ECU 40 starts scavenging the gas channels 12 and 13 in the fuel cell stack 10 (step S106). Due to scavenging, hydrogen in the anode gas channel 12 is discharged to the outside, and the electromotive force $V_{FC}$ of the fuel cell stack 10 decreases from the level before scavenging. That is, because the fuel cell system 100 according to the present embodiment connects the short circuit 47 to the fuel cell stack 10 and scavenges the fuel cell stack 10, the electromotive force of the fuel cell stack 10 can be decreased in a shorter time.

During scavenging of the fuel cell stack 10, the ECU 40 constantly monitors the electromotive force $V_{FC}$ of the fuel cell stack 10 by using the voltmeter 43. Scavenging of the fuel cell stack 10 is continued until the electromotive force $V_{FC}$ of the fuel cell stack 10 (the voltage measured by the voltmeter 43) reaches a predetermined value $V_1$ ("No" in step S107). However, when the short circuit 47 is connected to the fuel cell stack 10, the electromotive force $V_{FC}$ may decrease sharply and may temporarily become lower than the predetermined value $V_1$. Therefore, the ECU 40 determines that discharging has been finished and performs subsequent steps only when the electromotive force $V_{FC}$ becomes the predetermined value $V_1$ or less for a predetermined period or longer.

When the short circuit 47 is connected to the fuel cell stack 10, the electromotive force $V_{FC}$ may decrease sharply and become a negative voltage. Therefore, the ECU 40 disconnects the short circuit 47 from the fuel cell stack 10 when the electromotive force $V_{FC}$ becomes a negative voltage. When the short circuit 47 is disconnected, the electromotive force $V_{FC}$ recovers due to reaction of reactant gases remaining in the fuel cell stack 10. After the electromotive force $V_{FC}$ has recovered, the short circuit 47 is connected to the fuel cell stack 10 again. The ECU 40 repeats disconnection and connection of the short circuit 47 in this way (in other words, the short circuit 47 is duty-cycle controlled).

When the electromotive force $V_{FC}$ becomes lower than the predetermined value $V_1$ ("Yes" in step S107), the ECU 40 finishes scavenging the fuel cell stack 10 (FC) (step S108). Next, the ECU 40 disconnects the short circuit 47 from the fuel cell stack 10 (step S109). Even after scavenging has been finished, a small amount of hydrogen remains in the anode gas channel 12. The hydrogen is used to generate electricity and therefore the electromotive force $V_{FC}$ slightly increases.

After scavenging has been finished, the ECU 40 determines whether or not collision of the vehicle is unavoidable (step S110). If collision of the vehicle is unavoidable (that is, the probability of collision is considerably high), the vehicle will collide. In the present embodiment, the ECU 40 determines that collision of the vehicle is unavoidable if the time to collision is shorter than or equal to a minimum time to collision $T_1$, which is shorter than the time to collision $T_0$ used for determination in step S101.

If the ECU 40 determines that collision of the vehicle is unavoidable ("Yes" in step S110), the ECU 40 switches the FC contactor 44 to a disconnection mode (step S111). Thus, the fuel cell stack 10 becomes disconnected from the electric power consumption system (the motor 41 and the like). Thus, with the present embodiment, if the ECU 40 (collision prediction unit) predicts that the probability of collision of the vehicle is at a level at which collision is unavoidable, the ECU 40 controls the FC contactor 44 (that is, the circuit breaker) to electrically disconnect the motor 41 (drive unit) from the fuel cell stack 10. Moreover, the ECU 40 switches the battery contactor 46 to a disconnection mode (step S112). Thus, the battery 42 becomes electrically disconnected from the fuel cell system 100.

If collision of the vehicle is avoidable after scavenging has been finished ("No" in step S110, which is a case where, for example, the time to collision calculated after scavenging has been finished is longer than $T_1$), the ECU 40 restarts supplying hydrogen to the fuel cell stack 10, and the fuel cell stack 10 (FC) restarts generating electricity (step S113). Thus, the motor 41 is driven by electric power from the fuel cell stack 10.

Control Performed During Scavenging

Next, how the units of the fuel cell system 100 are controlled when scavenging of the gas channels 12 and 13 in the fuel cell stack 10 is performed will be described with reference to FIGS. 3A to 4I. FIGS. 3A to 3I illustrate how the units of the fuel cell system 100 are controlled when collision is unavoidable ("Yes" in step S110 of FIG. 2). FIGS. 4A to 4I illustrate how the units of the fuel cell system 100 are controlled when collision is avoidable ("No" in step S110 of FIG. 2). In FIGS. 3A to 4I, the control intervals of the units are exaggerated for convenience of illustration. In practice, the control intervals are shorter than those in FIGS. 3A to 4I.

(1) Control Performed when Collision is Unavoidable

First, how the units are controlled when collision is unavoidable will be described with reference to FIGS. 3A to 3I.

Figures 3A, 3B:
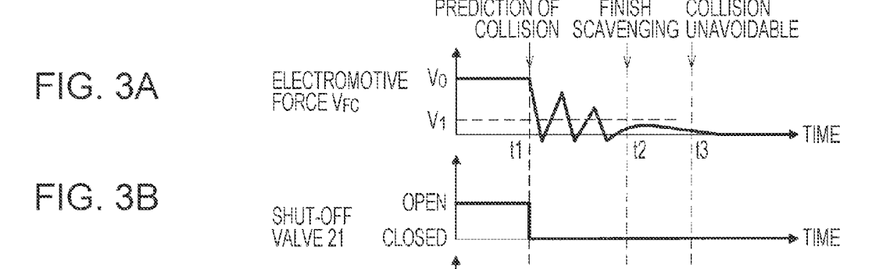
FIGS. 3A to 3I illustrate how units of the fuel cell system are controlled when collision is unavoidable.

When the vehicle is normally driven, the motor 41 is driven by the electromotive force $V_{FC}$ of the fuel cell stack 10 (FIG. 3A). The shutoff valve 21 is open and hydrogen is supplied to the fuel cell stack 10 (FIG. 3B). The short circuit 47 is disconnected from the fuel cell stack 10 (FIG. 3C, that is, the fuel cell stack 10 is not short-circuited). The scavenging-gas intake valve 33 and the scavenging-gas outlet valve 25 are closed (FIGS. 3D and 3E). Air is supplied to the fuel cell stack 10 as the pump 30 is rotated at a normal speed and the back-pressure valve 32 is opened to a normal degree (FIGS. 3F and 3G). The FC contactor 44 and the battery contactor 46 are both in connection modes (FIGS. 3H and 3I).

When the vehicle is normally driven, if the ECU 40 predicts that the probability of collision of vehicle is high, the ECU 40 connects the short circuit 47 to the fuel cell stack 10 and scavenges the fuel cell stack 10. To be specific, first, the ECU 40 closes the shutoff valve 21 (FIG. 3B). Thus, supply of hydrogen to the fuel cell stack 10 is stopped, and the fuel cell stack 10 stops generating electricity. The motor 41 is driven by electric power from the battery 42.

Figure 3C:
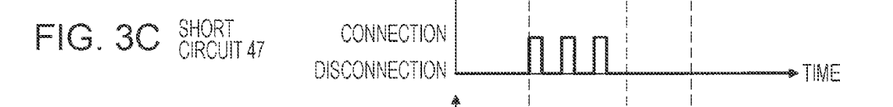
Figure 3D:
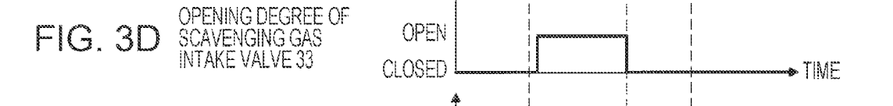
Figure 3E:
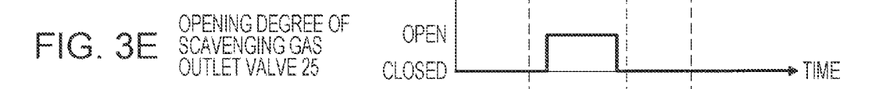
Figure 3F:
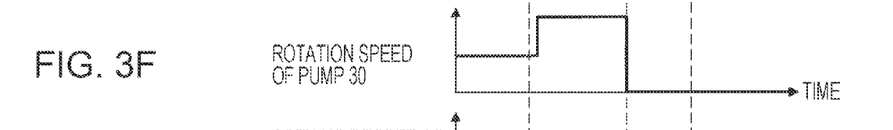
Figure 3G:
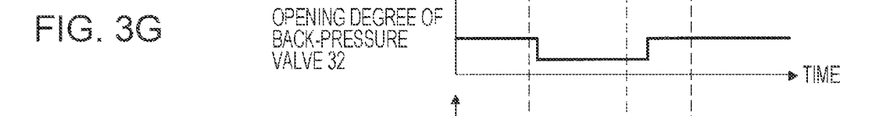
Figure 3H:
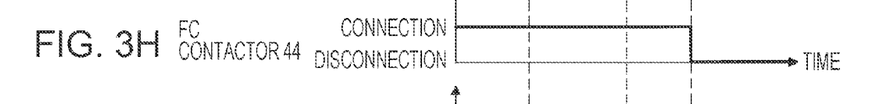
Figure 3I:
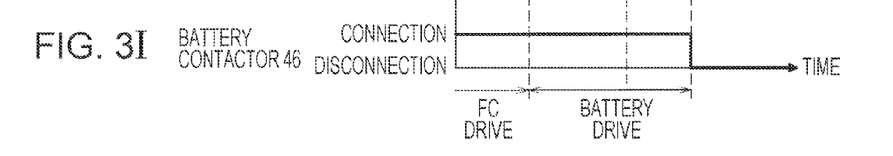

Next, the ECU 40 connects the short circuit 47 to the fuel cell stack 10 (FIG. 3C). The electromotive force $V_{FC}$ of the fuel cell stack 10 decreases sharply (FIG. 3A). As described above, when the electromotive force $V_{FC}$ becomes a negative voltage, the short circuit 47 is disconnected from the fuel cell stack 10. When the short circuit 47 is disconnected, the electromotive force $V_{FC}$ recovers due to reaction of reactant gases remaining in the fuel cell stack 10. The ECU 40 periodically repeats such control until time t2 (FIG. 3C). Note that the electromotive force $V_{FC}$ may become a negative voltage if, for example, the fuel cell stack 10 is overdischarged.

While the ECU 40 repeats connection and disconnection of the short circuit 47, scavenging of the fuel cell stack 10 is also performed. To be specific, first, the ECU 40 fully opens the scavenging-gas intake valve 33 and accelerates the rotation speed of the pump 30 (FIGS. 3D and 3F). Thus, the flow rate of air supplied to the gas channels 12 and 13 (that is, the flow rate of scavenging gas) increases, and thereby the gas channels 12 and 13 are scavenged rapidly. Moreover, the ECU 40 decreases the degree to which the back-pressure valve 32 is opened (FIG. 3G) while increasing the rotation speed of the pump 30. Thus, the pressure of the cathode gas channel 13 becomes relatively high, and therefore air can more easily flow into the anode gas channel 12. After a short delay, the ECU 40 fully opens the scavenging-gas outlet valve 25. Thus, the gas pressure in the anode system sharply decreases, and the gas in the anode system is expelled to the outside in one go.

In this way, with the fuel cell system 100, the gas channels 12 and 13 are scavenged while connection and disconnection of the short circuit 47 are repeatedly performed. Therefore, although the electromotive force $V_{FC}$ recovers as described above when the short circuit 47 is connected and then disconnected, the amount of recovery of the electromotive force $V_{FC}$ gradually decreases (from time t1 to time t2 in FIG. 3A), because the amount of fuel gas remaining in the fuel cell stack 10 decreases gradually. The ECU 40 continues scavenging until the electromotive force VFC of the fuel cell stack 10 becomes $V_1$. The electromotive force $V_1$ is a predetermined value that is usually sufficiently smaller than $V_0$.

The ECU 40 monitors the electromotive force $V_{FC}$ of the fuel cell stack 10. Immediately before the electromotive force $V_{FC}$ becomes $V_1$, the ECU 40 fully closes the scavenging-gas outlet valve 25 (FIG. 3E). Subsequently, the ECU 40 finishes scavenging the fuel cell stack 10. If the short circuit 47 has been connected to the fuel cell stack 10, the ECU 40 disconnects the short circuit 47.

After scavenging has been finished, the ECU 40 fully closes the scavenging-gas intake valve 33 (FIG. 3D) and sets the rotation speed of the pump 30 to 0 (FIG. 3F). After a certain delay, the ECU 40 returns the degree to which a back-pressure valve 34 is opened to the level before scavenging (FIG. 3G). After scavenging has been finished, discharge of hydrogen from the anode gas channel 12 is stopped. Because new hydrogen is not supplied to the anode gas channel 12, the electromotive force $V_{FC}$ of the fuel cell stack 10 gradually decreases (from time t2 to time t3 in FIG. 3A).

As described above, when the ECU 40 predicts that the probability of collision of the vehicle is high, the ECU 40 subsequently determines whether or not collision is unavoidable (see step S110 in FIG. 2). If the ECU 40 determines that collision is unavoidable, the FC contactor 44 and the battery contactor 46 are switched to disconnection modes as illustrated in FIGS. 3H and 3I. Thus, the fuel cell stack 10 and the battery 42 are electrically disconnected from the fuel cell system 100. Therefore, even if the fuel cell stack 10 and the battery 42 become broken when collision of the vehicle occurs, the influence of the breakage on other units can be suppressed.

(2) Control Performed when Collision is Avoidable

Next, how the units of the fuel cell system 100 are controlled when collision is avoidable will be described with reference to FIGS. 4A to 4I. This control, which is performed when collision is avoidable, is the same as the control shown in FIGS. 3A to 3I in a part immediately before time t3 in FIGS. 3A to 3I. Therefore, in the description below, it is assumed, as an example, that the ECU 40 determines that collision is avoidable at time t4, instead of time t3 in FIGS. 3A to 3I.

Figures 4A, 4B:
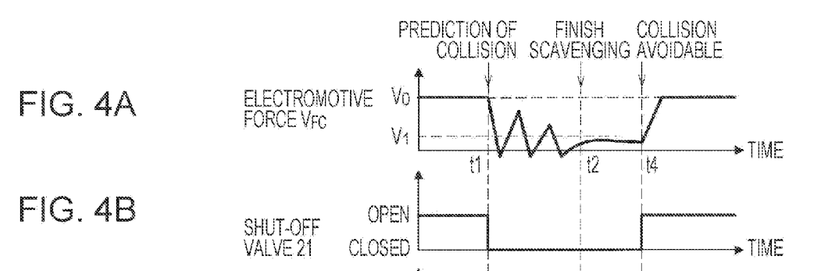
FIGS. 4A to 4I illustrate how the units of the fuel cell system are controlled when collision is avoidable.
Figure 4C:
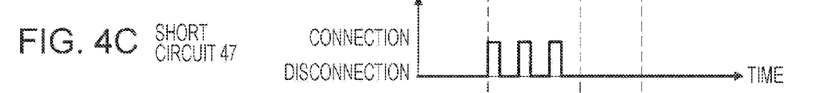
Figure 4D:
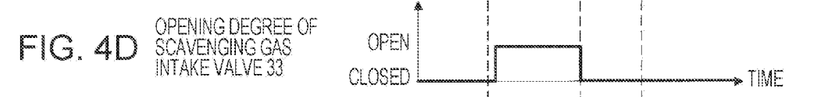
Figure 4E:
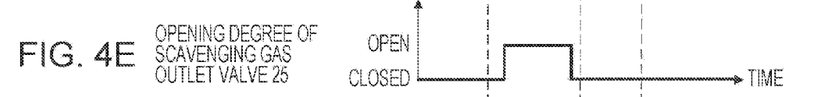
Figure 4F:
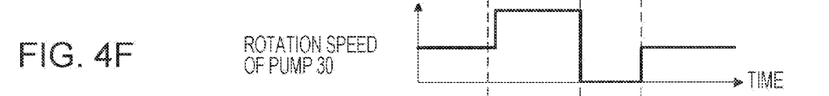
Figure 4G:
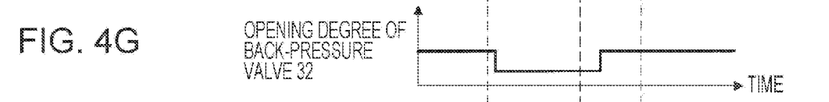
Figure 4H:
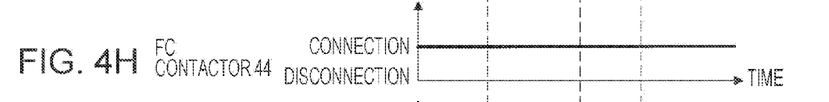
Figure 4I:
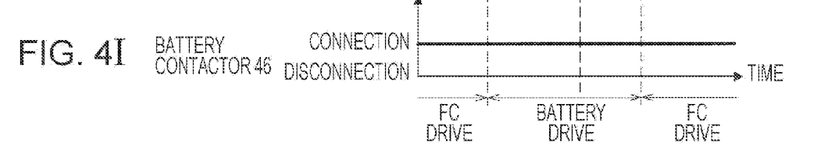

If the ECU 40 determines that collision is avoidable at time t4, the motor 41, which has been driven by electric power of the battery 42, becomes driven by electric power of the fuel cell stack 10 again. To be specific, if the ECU 40 determines that collision is avoidable at time t4, the shutoff valve 21 is opened to a degree before scavenging (FIG. 4B), and the rotation speed of the pump 30 is returned to the level before scavenging (FIG. 4F). Thus, hydrogen and air are supplied to the fuel cell stack 10 in the amounts the same as those before scavenging. If the short circuit 47 has been connected to the fuel cell stack 10, the ECU 40 disconnects the short circuit 47. With these operations, the electromotive force $V_{FC}$ of the fuel cell stack 10 increases (FIG. 4A). Thus, the motor 41 becomes driven by electric power from the fuel cell stack 10.

3. Advantages

With the fuel cell system 100 described above, when the probability of collision of vehicle is high, the electromotive force of the fuel cell can be decreased before collision occurs. To be specific, as described above, the fuel cell stack 10 is actively discharged by the short circuit 47. Thus, reduction in the electromotive force $V_{FC}$, which takes time if it is performed by using only the penetration resistance of the fuel cell stack 10, can be rapidly performed before collision of the vehicle occurs.

In particular, the fuel cell system 100 not only actively discharges the fuel cell stack 10 by connecting the short circuit 47 to the fuel cell stack 10, but also scavenges the anode gas channel 12 by using the pump 30. Thus, the electromotive force $V_{FC}$ of the fuel cell stack 10 can be decreased more rapidly. In this case, by performing discharging before scavenging, the amount of hydrogen discharged to the outside can be reduced. On the other hand, by performing scavenging before discharging, the electromotive force $V_{FC}$ of the fuel cell stack 10 can be decreased beforehand by scavenging, so that the amount of heat generated during discharging can be reduced.

In the fuel cell system 100, the FC contactor 44 is controlled to be disconnected only when it is determined that collision is unavoidable in step S110 (see FIG. 2). By doing so, frequent connection and disconnection of the FC contactor 44 can be avoided, and the lifetime of the FC contactor 44 can be increased.

Because the FC contactor 44 is disconnected after the electromotive force $V_{FC}$ of the fuel cell stack 10 has decreased due to short circuiting and scavenging, the FC contactor 44 can be prevented from becoming disconnected when the electromotive force $V_{FC}$ is still at a high voltage. Thus, the lifetime of the FC contactor 44 can be increased.

When the fuel cell stack 10 is actively discharged, the short circuit 47 is intermittently connected to the fuel cell stack 10 (in other words, the short circuit 47 is duty-cycle controlled). Therefore, the amount of heat generated due to short-circuiting of the fuel cell stack 10 can be reduced, and a decrease in the current-carrying performance due to an increase in the temperature of the fuel cell stack 10 can be suppressed. Thus, discharge of the fuel cell stack 10 can be performed more rapidly while avoiding a decrease in the current-carrying performance due to an increase in the temperature of the fuel cell stack 10.

When intermittently connecting the short circuit to the fuel cell stack 10, the short circuit 47 is disconnected from the fuel cell stack 10 if the electromotive force $V_{FC}$ of the fuel cell stack 10 becomes a negative voltage. Therefore, an excessive decrease in the electromotive force $V_{FC}$ of the fuel cell stack 10 can be avoided. Thus, excessive deterioration of the fuel cell stack 10 due to excessive discharge can be prevented. In the case where discharging is temporarily stopped because the electromotive force $V_{FC}$ of the fuel cell stack 10 becomes a negative voltage, discharging is restarted after a predetermined period. Thus, discharging can be performed more rapidly while preventing excessive deterioration of the fuel cell stack 10.

The motor 41 is driven by the battery 42 while the fuel cell stack 10 is being discharged. Therefore, a driving force is continued to be supplied to the vehicle even if it is determined that the probability of collision is high, so that the driver of the vehicle can take an action for avoiding collision with a vehicle or the like ahead.

If it is determined that collision of the vehicle is unavoidable, the fuel cell stack 10 and the battery 42 are electrically disconnected from the fuel cell system 100. Thus, for example, when the fuel cell stack 10 and the battery 42 become broken due to a collision, influence of the breakage on other units can be limited to the minimum.

If it is determined that collision of the vehicle is avoidable, the fuel cell stack 10 is connected to the motor 41 after the electromotive force $V_{FC}$ of the fuel cell stack 10 has recovered to a level substantially the same as that before the fuel cell stack 10 is discharged. Therefore, the motor 41 can be driven with substantially the same electromotive force $V_{FC}$ before and after control operations illustrated in FIGS. 3A to 4I are performed. Therefore, the driver can drive the vehicle without having a strange sensation despite a change in the voltage occurring due to the control operations illustrated in FIGS. 3A to 4I.

4. Modification

The present embodiment is not limited to that described above and may be modified in any way within the sprit and scope of the present disclosure.

For example, in the embodiment described above, the short circuit 47 is used as a discharge unit for discharging the fuel cell stack 10. However, the discharge unit is not limited to a short circuit and may be any device that can discharge the fuel cell stack 10. For example, the discharge unit may be a boosting circuit (booster) including a short circuit. The boosting circuit is a device that increases an input voltage (the voltage on the primary side) and outputs the increased voltage to the outside (the secondary side).

Figure 5:
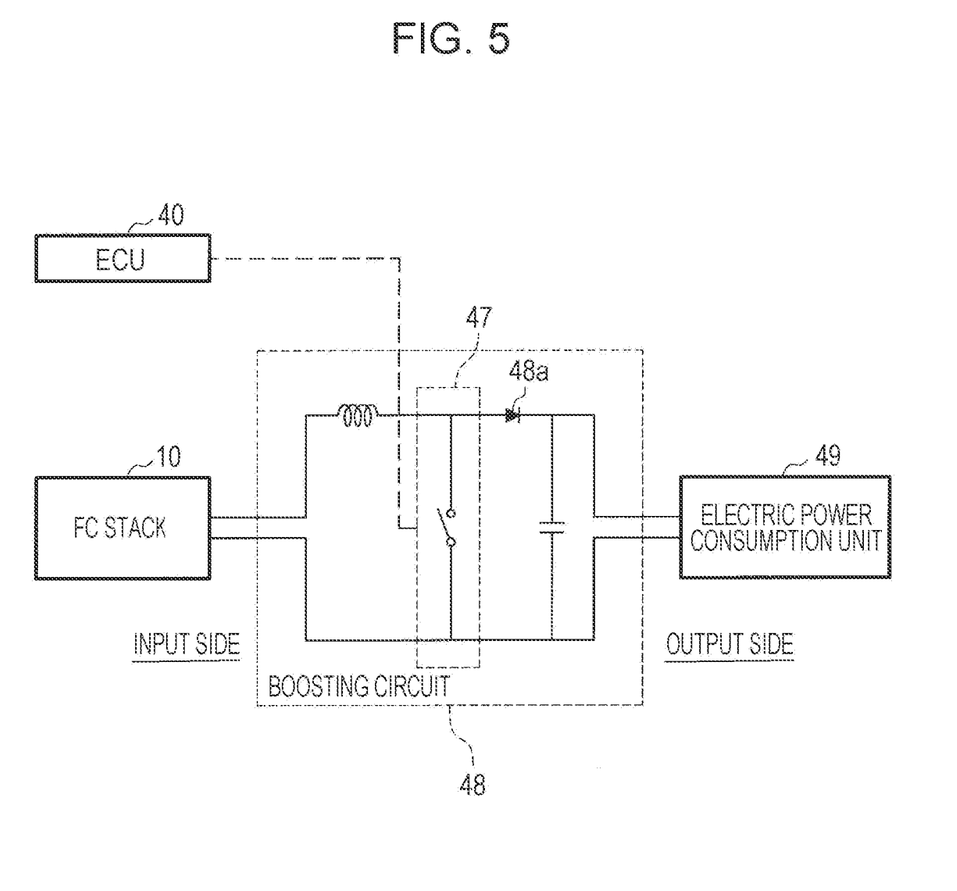
FIG. 5 illustrates a modification of a discharge unit that can be connected to the fuel cell system according to the present embodiment.

In the case where a boosting circuit 48 including the short circuit 47 is used as the discharge unit, the fuel cell stack 10 and the boosting circuit 48 (including the short circuit 47) may be connected to each other, for example, as illustrated in FIG. 5. A part of FIG. 5 is illustrated in a simplified manner.

As illustrated in FIG. 5, the fuel cell stack 10 is connected to the voltage-input side (the primary side) of the boosting circuit 48. An electric power consumption unit 49 is connected to the voltage-output side (the secondary side) of the boosting circuit 48. The electric power consumption unit 49 consumes electric power generated by the fuel cell stack 10. The electric power consumption unit 49 is, for example, a battery, a resistor, a motor, or the like. The boosting circuit 48 includes the short circuit 47 as described above, and the short circuit 47 is connected to the fuel cell stack 10.

The ECU 40 causes the fuel cell stack 10 to discharge electricity at a voltage between the lowest operating voltage and the withstand voltage of the electric power consumption unit 49. Moreover, the ECU 40 predicts a voltage boosted by the boosting circuit 48. If the ECU 40 determines that a voltage boosted by the boosting circuit 48 and output from the voltage-output side of the boosting circuit 48 will become lower than the rated voltage of the electric power consumption unit 49 connected to the voltage-output side, the ECU 40 connects the short circuit 47 to the fuel cell stack 10 to short-circuit the fuel cell stack 10. In this case, a diode 48a prevents the electric power consumption unit 49 from being short-circuited.

By configuring the discharge unit as described above, while the electromotive force $V_{FC}$ of the fuel cell stack 10 is still high, the electric power is supplied to the electric power consumption unit 49, and thereby the electric power remaining in the fuel cell stack 10 can be efficiently used. For example, when the electric power consumption unit 49 is connected to the motor 41, electric power remaining in the fuel cell stack 10 can be used to drive the motor 41.

By connecting the short circuit 47 to the fuel cell stack 10 when the electromotive force $V_{FC}$ of the fuel cell stack becomes low, the amount of heat generated due to short-circuiting can be reduced. In summary, by using a boosting circuit including a short circuit as the discharge unit, electric power remaining in the fuel cell stack 10 can be used as efficiently as possible, the amount of heat generated due to short-circuiting can be reduced, and the fuel cell stack 10 can be discharged rapidly.

In the case where the boosting circuit 48 illustrated in FIG. 5 is used, current control may be performed instead of voltage control described above. When performing current control, for example, an electric current may be sourced from the fuel cell stack 10 by setting the target at the maximum electric current that can be sourced.

For example, in the embodiment described above with reference to FIG. 2, the short circuit 47 is connected to the fuel cell stack 10 when the probability of collision of the vehicle becomes high. However, when the fuel cell stack 10 is actively discharged by connecting the short circuit 47, the fuel cell stack 10 considerably deteriorates. Therefore, whether or not to connect the short circuit 47 may be determined in accordance with the severity of collision, and the short circuit 47 need not be connected to the fuel cell stack 10 if the severity of collision is expected to be small.

To be specific, for example, control may be performed so as to discharge the fuel cell stack 10 only if the predicted collision is a serious collision having a strong impact that may break the electrolyte membrane or the like of the fuel cell stack 10. That is, the short circuit 47 may discharge the fuel cell stack 10 only if it is determined that a strong impact that may, for example, break the electrolyte membrane will be exerted on the vehicle. By doing so, it is possible to reduce a load applied to the fuel cell stack 10 due to active discharging in a case where it is determined that the collision is avoidable and the vehicle is continued to be driven.

Figure 6:
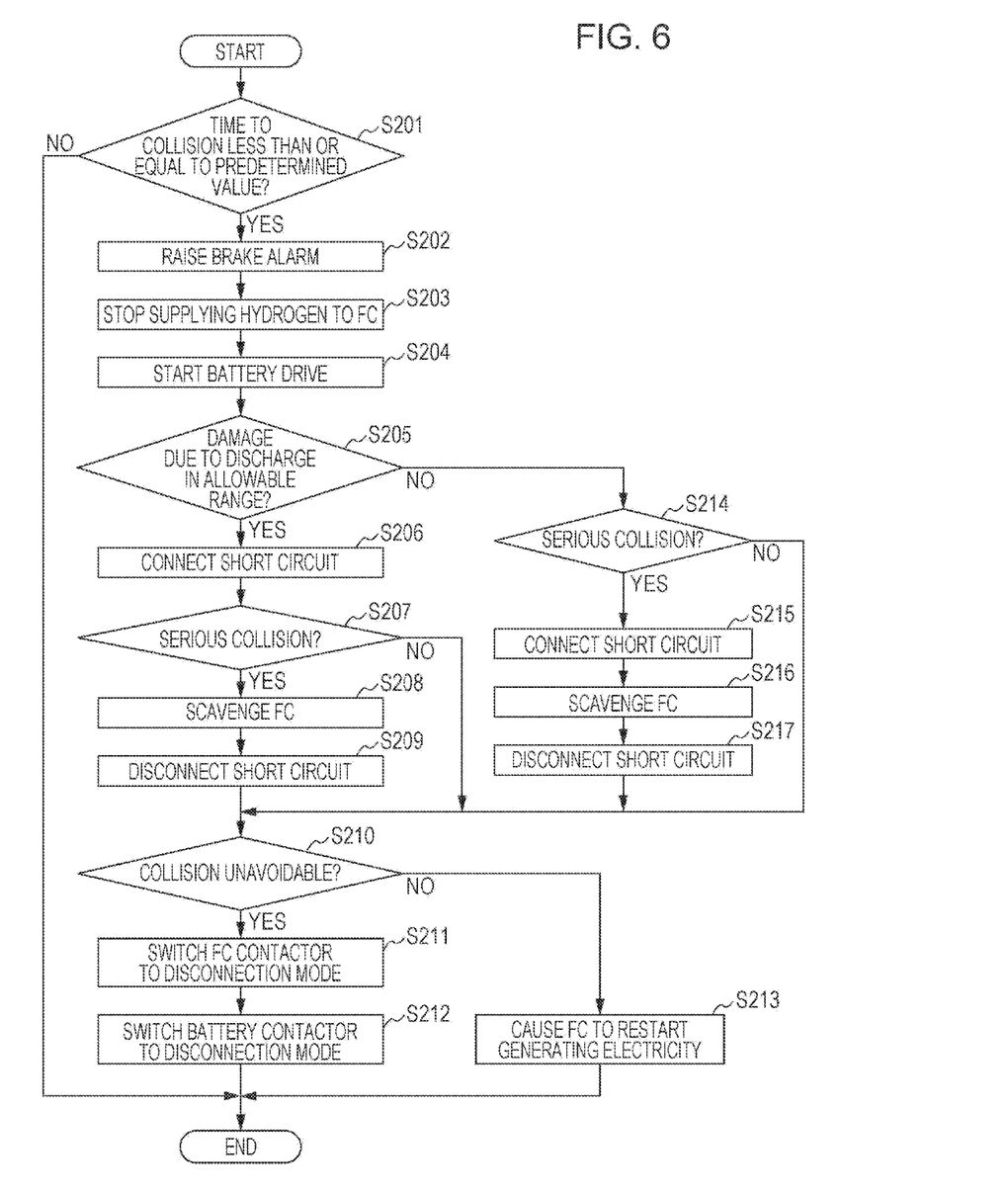
FIG. 6 is a control flow chart of a fuel cell system according to a modification of the present embodiment.

FIG. 6 is a control flow chart of such control. Descriptions of steps S201 to S204 in FIG. 6 will be omitted, because they are respectively the same as those of steps S101 to S104 in FIG. 2.

After the vehicle has been started to be battery driven (step S204), the ECU 40 determines whether or not damage to be inflicted on the fuel cell stack 10 if the fuel cell stack 10 is discharged will be in an allowable range (step S205). To be specific, the ECU 40 determines whether or not overdischarge will occur if the fuel cell stack 10 is discharged by connecting the short circuit 47 on the basis of the electromotive force $V_{FC}$ immediately before discharge. Moreover, the ECU 40 determines the severity of damage in accordance with the degree of overdischarge (that is, the voltage after discharge).

If damage due to discharge is in an allowable range ("Yes" in step S205), the short circuit 47 is connected to the fuel cell stack 10 (step S206). Then, the ECU 40 determines whether or not collision of the vehicle will be a serious collision (step S207). Here, the term "serious collision" refers to a collision causing an impact with which, for example, an airbag is inflated. A unit for predicting a serious collision may be a unit the same as the collision prediction unit described above. It is preferable that a millimeter-wave radar be used as such a unit. By doing so, the probability of serious collision can be more accurately and more reliably determined.

If it is determined that the collision will be a serious collision ("Yes" in step S207), the fuel cell stack 10 is scavenged (step S208) as in step S107 in FIG. 2. Subsequently, as in steps S109 to S113 in FIG. 2, the short circuit 47 is disconnected from the fuel cell stack 10 and the control process is finished (steps S209 to S213).

If it is determined in step S205 that damage due to discharge will be out of an allowable range ("No" in step S205), in contrast to the case of "Yes" in step S205, the short circuit 47 is not connected to the fuel cell stack 10. Instead, whether the collision will be a serious collision is first determined (step S214). If it is determined in step S214 that the collision will not be a serious collision ("No" in step S214), with consideration of the severity of damage inflicted on the fuel cell stack 10 due to overdischarge, the short circuit 47 is not connected to the fuel cell stack 10, and the operations in steps S210 to S213 are performed.

If it is determined that the collision will be a serious collision ("Yes" in step S214), damage to the fuel cell stack 10 due to overdischarge is neglected, and the short circuit 47 is connected to the fuel cell stack 10 so that the fuel cell stack 10 is actively discharged (step S215). Subsequently, as in steps S208 and S209 described above, the fuel cell stack 10 is scavenged and the short circuit 47 is disconnected from the fuel cell stack 10 (steps S216 and S217). Subsequently, the operations in steps S210 to S213 are performed.

As described above, in the control flow illustrated in FIG. 6, even when the probability of collision of the vehicle becomes high, the short circuit 47 is not immediately connected to the fuel cell stack 10. Thus, damage to the fuel cell stack 10 due to discharge can be reduced when collision of the vehicle does not occur or when the collision is not serious.

If damage to the fuel cell stack 10 due to discharge is in an allowable range ("Yes" in step S205), the short circuit 47 is connected to the fuel cell stack 10 (step S206) before it is determined that the collision will be a serious collision (step S207). However, the short circuit 47 may be connected to the fuel cell stack 10 at the same time as it is determined that the collision will be a serious collision and scavenging of the fuel cell stack 10 is started (step S208).

In step S105 described above with reference to FIG. 2, connection and disconnection of the short circuit 47 are repeated in accordance with the electromotive force $V_{FC}$ of the fuel cell stack 10. However, for example, connection and disconnection of the short circuit 47 may be repeated in accordance with the temperature of the fuel cell system 100, the temperatures of peripheral devices, the continuous allowable energization time that has been experimentally obtained, or the like.

In the embodiment described above, as described above with reference to FIG. 3, the short circuit 47 is disconnected when the electromotive force $V_{FC}$ of the fuel cell stack 10 (FIG. 3A) becomes a negative voltage. However, whether or not to disconnect the short circuit 47 may be determined on the basis of the electromotive force of only one of the unit cells 11 of the fuel cell stack 10. The short circuit 47 may be disconnected from the fuel cell stack 10 when the electromotive force $V_{FC}$ of the fuel cell stack 10 is likely to become a negative voltage. In general, the electromotive force $V_{FC}$ decreases very rapidly. Therefore, in the case where control is performed in accordance with the electromotive force $V_{FC}$, it is preferable that the units of the fuel cell system 100 be controlled with consideration of decrease in the electromotive force $V_{FC}$ that occurs due to time lags between control operations.

In the control flows described above with reference to FIGS. 2 and 6, the order of timings at which the FC contactor 44 and the battery contactor 46 are disconnected is not particularly limited. For example, the FC contactor 44 may be first disconnected (step S111) and then the battery contactor 46 may be disconnected (step S112), as shown in FIG. 2. Alternatively, this order may be reversed. However, it is preferable that the FC contactor 44 and the battery contactor 46 be simultaneously disconnected so that electric power can be efficiently used during discharge and the discharge speed can be increased.

In the control flows described above with reference to FIGS. 2 and 6, connection of the short circuit 47 and scavenging of the fuel cell stack 10 are performed in different steps. However, these operations may be performed simultaneously.

In the embodiment described above, connection of the short circuit 47 and scavenging of the fuel cell stack 10 are both performed. However, it is not necessary to perform scavenging, because the electromotive force $V_{FC}$ of the fuel cell stack 10 can be decreased rapidly by connecting the short circuit 47 to the fuel cell stack 10.

For example, in the embodiment described above, a millimeter-wave radar for measuring the inter-vehicle distance and the relative velocity is used as a collision prediction unit. However, the collision prediction unit is not limited to a millimeter-wave radar and may be any appropriate device. For example, the inter-vehicle distance and the relative velocity may be measured by analyzing still images or moving images taken by a camera mounted in the vehicle. The probability of collision may be predicted from an indicator other than the inter-vehicle distance. Examples of such an indicator include the acceleration of the vehicle and a load applied to the vehicle. Further alternatively, only the inter-vehicle distance may be used, or both the inter-vehicle distance and the relative velocity may be used.

In a case where the acceleration of the vehicle is used as the indicator for collision and an acceleration sensor is used as the collision prediction unit, it may be determined that hard braking has been performed when the acceleration of the vehicle measured by the acceleration sensor becomes a predetermined value or greater, and then scavenging may be performed. In a case where a load applied to the vehicle is used as the indicator and a load sensor is used as the collision prediction unit, it may be determined that hard braking has been performed when a load measured by the load sensor becomes predetermined value or greater, and then discharging may be performed. Alternatively, whether or not the probability of collision is high may be determined by using another sensor, such as a sensor for an airbag (acceleration sensor or the like). More simply, whether or not the probability of collision is high may be determined in accordance with the speed of the vehicle displayed on the speedometer (not shown) or in accordance with only the inter-vehicle distance. By using a plurality of sensors, the probability of collision can be determined more accurately.

Reactant gases supplied to the fuel cell stack 10 are not limited to a fuel gas and an oxidant gas. The fuel gas is not limited to hydrogen and may be any gas that generates electric power by reacting with an oxidant gas. The oxidant gas is not limited to air and may be any gas that generates electric power by reacting with a fuel gas.

In the fuel cell system 100, the ECU 40, which is a single device, controls the units of the fuel cell system 100. Alternatively, a plurality of ECUs and the like may control the units in corporation with each other.

Some of the embodiments and the modifications described above may be selected and used in combination within the spirit and scope of the present disclosure.

What is claimed is:

1. A fuel cell system mounted in a vehicle, comprising:
   a fuel cell including a gas channel to which a reactant gas is to be supplied to generate electricity;
   a collision prediction device configured to predict probability of collision of the vehicle;
   a discharge device configured to discharge the electricity from the fuel cell; and
   a controller configured to control the discharge device to discharge the electricity from the fuel cell in a case where the collision prediction device predicts that the probability of collision of the vehicle is higher than a predetermined probability,
   wherein the controller is configured to control the discharge device to discharge the electricity from the fuel cell intermittently.

2. A fuel cell system comprising:
   a fuel cell including a gas channel to which a reactant gas is to be supplied to generate electricity;
   a collision prediction device configured to predict probability of collision of the vehicle;
   a discharge device configured to discharge the electricity from the fuel cell;
   a controller configured to control the discharge device to discharge the electricity from the fuel cell in a case where the collision prediction device predicts that the probability of collision of the vehicle is higher than a predetermined probability; and
   a voltage measurement device configured to measure an electromotive force of the fuel cell,
   wherein the controller is configured to control the discharge device to discharge the electricity from the fuel cell intermittently, and
   wherein, in a case where the electromotive force of the fuel cell measured by the voltage measurement device becomes a negative voltage, the controller is configured to control the discharge device to temporarily stop discharging the electricity from the fuel cell and to restart discharging the electricity from the fuel cell after a predetermined period.

3. The fuel cell system according to claim 1,
   wherein the discharge device comprises a boosting circuit including a short circuit, a voltage input side of the boosting circuit is connected to the fuel cell, and a voltage output side of the boosting circuit is connected to an electric power consumption device that consumes electric power of the fuel cell, and
   wherein, in a case where the control unit determines that a voltage that is input from the voltage-input side, that is boosted by the boosting circuit, and that is output from the voltage output side will become lower than a rated voltage of the electric power consumption device, the controller connects the short circuit to the fuel cell so that the fuel cell is short-circuited to discharge electricity.

4. The fuel cell system according to claim 1, further comprising:
   a drive device that is connected to the fuel cell and that is configured to drive the vehicle using electric power generated by the fuel cell; and
   a circuit breaker configured to electrically disconnect the drive device from the fuel cell in a case where the collision prediction device predicts that the probability of collision of the vehicle is at a level such that collision is unavoidable.

5. The fuel cell system according to claim 2,
wherein the discharge device comprises a boosting circuit including a short circuit, a voltage input side of the boosting circuit is connected to the fuel cell, and a voltage output side of the boosting circuit is connected to an electric power consumption device that consumes electric power of the fuel cell, and
wherein, in a case where the control unit determines that a voltage that is input from the voltage-input side, that is boosted by the boosting circuit, and that is output from the voltage output side will become lower than a rated voltage of the electric power consumption device, the controller connects the short circuit to the fuel cell so that the fuel cell is short-circuited to discharge electricity.

6. The fuel cell system according to claim 2, further comprising:
a drive device that is connected to the fuel cell and that is configured to drive the vehicle using electric power generated by the fuel cell; and
a circuit breaker configured to electrically disconnect the drive device from the fuel cell in a case where the collision prediction device predicts that the probability of collision of the vehicle is at a level such that collision is unavoidable.

7. The fuel cell system according to claim 3, further comprising:
a drive device that is connected to the fuel cell and that is configured to drive the vehicle using electric power generated by the fuel cell; and
a circuit breaker configured to electrically disconnect the drive device from the fuel cell in a case where the collision prediction device predicts that the probability of collision of the vehicle is at a level such that collision is unavoidable.

8. A fuel cell system mounted in a vehicle, comprising:
a fuel cell including a gas channel to which a reactant gas is to be supplied to generate electricity;
collision prediction means for predicting probability of collision of the vehicle;
discharge means for discharging the electricity from the fuel cell; and
controlling means for controlling the discharge means to discharge the electricity from the fuel cell in a case where the collision prediction means predicts that the probability of collision of the vehicle is higher than a predetermined probability,
wherein the controlling means is configured to control the discharge means to discharge the electricity from the fuel cell intermittently.

9. A vehicle fuel cell system discharging method comprising:
disconnecting a discharge device during a normal operation of a vehicle;
predicting probability of collision of the vehicle; and
discharging electricity from a fuel cell mounted in the vehicle in a case where probability of collision of the vehicle is higher than a predetermined probability, including actively discharging the fuel cell by a short circuit by connecting the fuel cell to the discharge device to discharge the electricity from the fuel cell and decrease an electromotive force of the fuel cell, wherein the electricity is discharged from the fuel cell intermittently.

10. The fuel cell system according to claim 1, wherein the discharge device includes a short circuit configured to actively discharge the fuel cell.

11. The fuel cell system according to claim 1, wherein the discharge device is disconnected from the fuel cell during a normal operation and is connected to the fuel cell to discharge the electricity from the fuel cell to decrease an electromotive force of the fuel cell.

12. The fuel cell system according to claim 8, wherein the discharge means includes a short circuit configured to actively discharge the fuel cell.

13. The fuel cell system according to claim 8, wherein the discharge means is disconnected from the fuel cell during a normal operation and is connected to the fuel cell to discharge the electricity from the fuel cell to decrease an electromotive force of the fuel cell.

* * * * *